United States Patent [19]

Mayska et al.

[11] Patent Number: 4,981,919

[45] Date of Patent: Jan. 1, 1991

[54] END CAPPED THERMALLY STABLE POLYPHENYLENE OXIDE (PPO)

[75] Inventors: Paul J. Mayska; Ludwig Bottenbruch; Hans-Rudolf Dicke, all of Krefeld, Fed. Rep. of Germany

[73] Assignee: Bayer Aktiengesellschaft, Leverkusen, Fed. Rep. of Germany

[21] Appl. No.: 336,693

[22] Filed: Apr. 12, 1989

[30] Foreign Application Priority Data

Apr. 27, 1988 [DE] Fed. Rep. of Germany ....... 3814166

[51] Int. Cl.$^5$ .............................................. C08G 65/48

[52] U.S. Cl. .................................... 525/390; 528/214; 528/217

[58] Field of Search ................. 525/390; 528/217, 214

[56] References Cited

U.S. PATENT DOCUMENTS 3,424,722 1/1969 Jerussi et al. ........................ 525/390
3,507,832 4/1970 Davis et al. ............................ 260/47

*Primary Examiner*—Harold D. Anderson
*Attorney, Agent, or Firm*—Connolly and Hutz

[57] ABSTRACT

This invention relates to a new thermally stable polyphenylene oxide (PPO) and to its use as thermoplastic material.

3 Claims, No Drawings

END CAPPED THERMALLY STABLE POLYPHENYLENE OXIDE (PPO)

This invention relates to a new thermally stable polyphenylene oxide (PPO) and to its use as thermoplastic material.

The polyphenylene oxide according to the invention corresponds to formula (I)

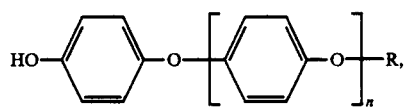

wherein n stands for an integer from 20 to 500 and

R stands for $C_1-C_{10}$-alkyl groups and $C_6-C_{24}$-aryl groups.

Preferred polyphenylene oxides correspond to formula (II):

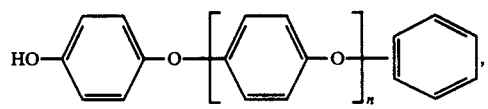

wherein n stands for an integer with a value from 50 to 500.

Preparation of the polyphenylene oxides is carried out by a process analogous to known processes starting from the corresponding p-halogen phenols, e.g. according to Ullmann. Known methods of preparation suitable for this purpose are described, for example, in FR-PS No. 1301174, in U.S. Pat. Nos. 3,228,910, 3,491,058, 3,507,832 and 3,455,736 and by H. M. van Dort et al., in Europ. Polym. Jr. 4, 275 (1968) and Erich Behr,"Hochtemperaturbeständige Kunststoffe" (Carl-Hanser-Verlag, Munich 1969), etc.

These processes employ p-halogen phenolates as starting materials for the preparation of polyphenylene oxides. The compounds obtained are in most cases thermally unstable. Even when attempts are made to dissolve the compounds, e.g. in NMP, the solution gels and if the polymers are melted at 290° C. under nitrogen (5 min.) they cannot be dissolved in NMP (N-methylpyrrolidone).

It has now been found that thermally stable PPO may be prepared by introducing certain end groups into these compounds.

The end group is preferably introduced by the reaction of PPO with alkali metal salts, e.g. of aliphatic and aromatic hydroxy compounds, e.g. alcohols such as methanol, ethanol, phenol, p-anisole, etc.

When the PPO has been modified with phenolates, it is found to have improved stability, e.g. at high temperatures (e.g. 290° C., 5 min. under nitrogen) and after it has been heated to high temperatures it is capable of dissolving in boiling NMP at a concentration of 5% to form a clear solution.

The introduction according to the invention of end groups carrying non-functional groups may also be carried out in the presence of conventional branching agents such as 1,3,5-trihydroxybenzene (phloroglucinol), 1,3,5-tribromobenzene and 1,3-dibromo-5-hydroxybenzene by analogy with known processes.

The compounds according to the invention may be used as thermoplasts and may be worked up by known processes to form fibres, sheet products, moulded articles, semifinished products, etc.

They may be used alone or as mixtures with other thermoplasts. Examples of components with which they may be mixed include other polyarylethers, polyesters, polycarbonates, polyacrylates, polyetherimides, vinyl polymers, polyamides. etc.

The mixtures may contain from 5 to 95% of the polyphenylene oxides according to the invention.

The polyphenylene oxides according to the invention may also contain conventional mineral fillers such as chalk, silicon oxide, glass spheres, glass powder, aluminium, clay and fibres such as glass or carbon fibres, etc., singly or as mixtures. They may also be mixed with conventional pigments (titanium dioxide), thermal stabilizers (zinc oxide), UV stabilizers, plasticizers, etc.

EXAMPLE 1

The preparation of polyphenylene oxide having a reactive end group at each chain end (a) Preparation of the starting compound, p-sodium bromophenolate 400.0 g (2.31 mol) of p-bromophenol are dissolved in 200 ml of methanol under nitrogen. 201.3 g (2.26 mol) of 45% sodium hydroxide solution are then added. The mixture is heated and about 200–300 ml of a methanol/-water mixture are distilled off. 500 ml of toluene are added and the remainder of the water is distilled off azeotropically. The salt precipitates. The mixture is cooled and suction filtered through a G-3 glass suction filter under nitrogen. The solid substance is washed twice with cyclohexane and dried in a high vacuum at 60° C.

| $C_6H_4BrNaO$ | theoretical | found |
|---|---|---|
| C | 36.96 | 36.8 |
| H | 2.07 | 2.30 |
| O | 8.20 | |
| Na | 11.79 | 12.3 |
| Br | 40.98 | 40–42% |

(b) Preparation of phenol-terminated PPO by the reaction of PPO with sodium phenolate 84.5 g of diphenylsulphone are charged into a 500 ml three-necked flask under nitrogen and heated to 150° C. 100 mg of Cu(I)Cl in 6 ml of pyridine are added at this temperature and the reaction mixture is then heated to 180° C. At this temperature, 27.3 g (0.144 mol) of p-sodium bromophenolate and 0.99 g (6 mol-%) of sodium phenolate are added. The temperature is maintained at 195° C. for 4 hours and the product is precipitated from acetone/isopropanol after cooling. The product is suction filtered and washed with distilled water until neutral. It is then boiled under reflux in hydrochloric acid methanol (2:1) for 2 hours, washed until neutral and dried.

Yield: 9.3 g (71%)

Melting point: 260° C.

EXAMPLE 3 (Comparison Example)

Preparation of a PPO without end groups p-Bromophenolate is polymerised as in Example 1b without the addition of sodium phenolate.

Yield: 10.6 g (81%)
Melting point: 250° C.

EXAMPLE 4

Determination of the thermal stability 1 g of Substance is weighed into a 50 ml flask and placed for 5 minutes under nitrogen into a salt bath which is at a temperature of 290° C. After cooling, the product is broken down into small pieces and its solubility in hot NMP is tested.

|  | Solubility before tempering | Solubility after tempering |
| --- | --- | --- |
| with end group (Example 1b) | 5% clear solution | 5% clear solution |
| without end group (comparison) | gels on dissolving | solubility less than 1% |

We claim:
1. Polyphenylene oxide consisting of the formula (I)

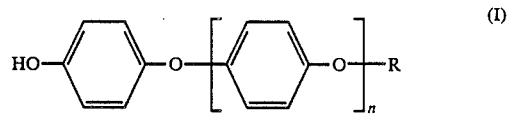

wherein
n represents for an integer with a value from 20 to 500 and
R represents $C_1$–$C_{10}$-alkyl or $C_6$–$C_{24}$-aryl groups.
2. Polyphenylene oxide corresponding to formula (II)

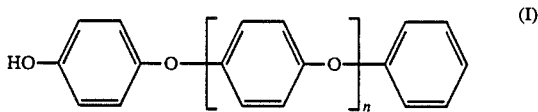

wherein n represents an integer with a value from 50 to 500.
3. A molded article of the polyphenylene oxide of claim 1.

* * * * *